United States Patent
Bolin et al.

(10) Patent No.: US 8,821,082 B1
(45) Date of Patent: Sep. 2, 2014

(54) STIFFENING SLEEVE FOR TOOL HOLDERS

(75) Inventors: Jared L. Bolin, Millstadt, IL (US); Ryan L. Hanks, Shipman, IL (US)

(73) Assignee: The Boeing Company, Chicago, IL (US)

( * ) Notice: Subject to any disclaimer, the term of this patent is extended or adjusted under 35 U.S.C. 154(b) by 865 days.

(21) Appl. No.: 12/568,877

(22) Filed: Sep. 29, 2009

(51) Int. Cl.
*B23C 5/16* (2006.01)

(52) U.S. Cl.
CPC ...................... *B23C 5/16* (2013.01)
USPC ......................... 409/132; 408/143

(58) Field of Classification Search
USPC ............. 409/132, 141, 234; 408/143; 407/66, 407/102; 82/1.11
IPC ....................................................... B23B 29/02
See application file for complete search history.

(56) References Cited

U.S. PATENT DOCUMENTS

| | | | |
|---|---|---|---|
| 3,230,833 A * | 1/1966 | Shurtliff ........................ | 409/141 |
| 4,998,851 A * | 3/1991 | Hunt ............................. | 408/143 |
| 5,000,631 A | 3/1991 | Deutschenbaur et al. | |
| 5,311,654 A | 5/1994 | Cook | |
| 5,593,258 A | 1/1997 | Matsumoto et al. | |
| 5,775,857 A | 7/1998 | Johne | |
| 6,280,126 B1 * | 8/2001 | Slocum et al. ................ | 409/141 |
| 6,511,265 B1 | 1/2003 | Mirchandani et al. | |
| 6,571,451 B2 * | 6/2003 | Satran et al. .................... | 29/447 |
| 7,270,506 B2 | 9/2007 | Guy | |
| 2006/0288820 A1 | 12/2006 | Mirchandani et al. | |
| 2007/0081873 A1 | 4/2007 | Blomstedt et al. | |
| 2008/0170917 A1 | 7/2008 | Hilker | |
| 2008/0226401 A1 * | 9/2008 | Hoefler et al. .................. | 407/34 |
| 2009/0003947 A1 * | 1/2009 | Haimer et al. ................ | 408/143 |

FOREIGN PATENT DOCUMENTS

| | | | | |
|---|---|---|---|---|
| DE | 3409581 A1 * | 9/1984 | ............. | B24B 45/00 |
| JP | 59169707 | 9/1984 | | |
| JP | 59187407 | 10/1984 | | |
| JP | 61226231 | 10/1986 | | |
| JP | 03073210 | 3/1991 | | |
| JP | 05092329 | 4/1993 | | |
| JP | 06031505 A * | 2/1994 | ............. | B23B 29/02 |
| JP | 2004338079 A * | 12/2004 | ................ | B23C 5/16 |
| WO | WO 2006050952 A1 * | 5/2006 | ............. | B23Q 31/02 |

OTHER PUBLICATIONS

English Abstract of DE3409581A1—Renker, Hansjoerg, "Tool Holder for Holding Machining Tool," Sep. 20, 1984.*
Bolin et al., "Cutting Tool Sleeve for Tool Holders," USPTO U.S. Appl. No. 12/772,637, filed May 3, 2010, 64 pages.
Office Action dated Jan. 31, 2013, regarding USPTO U.S. Appl. No. 12/772,637, 20 pages.

(Continued)

*Primary Examiner* — Daniel Howell
*Assistant Examiner* — Michael Vitale
(74) *Attorney, Agent, or Firm* — Yee & Associates, P.C.

(57) ABSTRACT

A method and apparatus may be present for performing an operation on a workpiece. A tool holder with a sleeve and workpiece may be positioned relative to each other. The rod tool holder may be attached to a machine and may have a first stiffness. The sleeve may have a channel and a second stiffness. The channel may be configured to receive at least a portion of the rod. The operation may be performed using the rod with the tool on the workpiece.

20 Claims, 11 Drawing Sheets

(56) References Cited

OTHER PUBLICATIONS

Office Action dated Apr. 25, 2013, regarding USPTO U.S. Appl. No. 12/772,637, 13 pages.

Office Action dated Nov. 21, 2013, regarding USPTO U.S. Appl. No. 12/772,637, 14 pages.

Final Office Action dated May 7, 2014, regarding USPTO U.S. Appl. No. 12/772,637, 17 pages.

* cited by examiner

STIFFENING SLEEVE FOR TOOL HOLDERS

BACKGROUND INFORMATION

1. Field

The present disclosure relates generally to fabricating parts and, in particular, to a method and apparatus for performing machining operations on a workpiece for fabricating a part.

2. Background

In fabricating parts, machines may be used to perform operations on workpieces to form the parts. One type of operation performed on the workpieces may be machining. Machining may involve removing materials from a workpiece. Machining may be typically performed to selectively remove metal. Machining also may be performed for other types of materials, such as plastics or composite materials. Machining may include, for example, without limitation, drilling, milling, shaping, planing, boring, broaching, sawing, burnishing, and/or other similar types of operations. Machines used to perform these types of operations may include, for example, without limitation, a lathe, a milling machine, a drill press, and/or other suitable types of devices.

When performing a machining operation on a workpiece, the machine may employ a cutting tool, such as a cutter. The cutter may have one or more sharp edges and may be made of material that is harder than the material in the workpiece. The cutter on a machine may be secured to a tool holder. The tool holder may then be secured to a spindle and/or other component of a milling machine. The tool may have various lengths, depending on the particular operation that may be performed. For example, without limitation, if the milling operation is to be performed through the entire thickness of a workpiece, the tool may have a length that allows the cutter to reach through the thickness of the workpiece. As the workpiece increases in thickness, the length of the tool may be increased to allow the cutter to reach through the entire thickness of the workpiece.

As the length of a tool increases, the flexibility of the tool increases. An increase in flexibility means that the tool may be displaced or deflected during a machining operation from an axis extending through the tool. In other words, the stiffness of the tool may decrease. The displacement of the tool may cause undesirable finishes in the surface of the tool. A poor surface finish may be referred to as chatter. Chatter may result in an undulating and/or irregular finish on the surface of the workpiece.

With surface finishes having chatter and/or other types of undesirable surface finishes, a part may not meet tolerances and/or may not have the desired aesthetics. As a result, the part may require reworking and/or may be scrapped. Consequently, additional time and expense may be incurred in fabricating parts.

Therefore, it would be advantageous to have a method and apparatus that takes into account at least some of the issues described above, as well as possibly other issues.

SUMMARY

In one advantageous embodiment, an apparatus may comprise a tool holder and a sleeve. The tool holder may have a first stiffness in which the tool holder is configured for use with a machine. The sleeve may have a channel, a first opening at a first end of the channel, a second opening at a second end of the channel, and a second stiffness. The second stiffness may be greater than the first stiffness. The sleeve may be configured to receive at least a portion of the rod in the channel.

In another advantageous embodiment, an apparatus for holding a tool for a milling machine may comprise a rod, a first interface, a second interface, and a sleeve. The rod may have a first end and a second end, may be comprised of steel, and may have a first stiffness. The first interface may be at the first end of the rod in which the first interface may be configured for attachment to the milling machine. The second interface may be at the second end of the rod in which the second interface may be configured to hold the tool. The sleeve may have a channel and a second stiffness. The channel may be comprised of a metal carbide and may be configured to receive at least a portion of the rod and retain the portion of the rod using at least one of an interference fit and an adhesive.

In yet another advantageous embodiment, an apparatus for holding a cutter for a lathe may comprise a rod, a first interface, a second interface. The rod may have a first end and a second end. The rod may be comprised of steel and may have a first stiffness. The first interface may be at the first end of the rod and may be configured for attachment to the lathe. The second interface may be at the second end of the rod and may be configured to hold the cutter. The sleeve may have a channel and a second stiffness. The channel may be comprised of a metal carbide and may be configured to receive at least a portion of the rod and retain the portion of the rod using at least one of an interference fit and an adhesive.

In still yet another advantageous embodiment, an apparatus for holding a tool may comprise a rod, a first interface, a second interface, and a sleeve. The rod may have a first end and a second end. The rod may be comprised of steel and may have a first stiffness. The first interface may be at the first end of the rod and may be configured for attachment to a machine selected from one of a milling machine and a lathe. The second interface may be at the second end of the rod and may be configured to hold the tool. The sleeve may have a channel, a first opening at a first end of the channel, a second opening at a second end of the channel, and a second stiffness. The sleeve may be configured to receive at least a portion of the rod through the first opening and the second opening. The sleeve may be configured to be associated with the rod using one of an interference fit and an adhesive. The sleeve may be comprised of a material selected from titanium carbide and tungsten carbide. The sleeve may have a cross section with a shape selected from one of a circle, an octagon, a hexagon, and an ellipse. An overall stiffness for the rod in the channel of the sleeve may be selected as follows:

$$\text{stiffness} = 3(E1\,I1 + E2\,I2)/L^3,$$

wherein E1 may be Young's modulus for the rod, E2 may be Young's modulus for the sleeve, I1 may be a cross-sectional inertia for the rod, I2 may be a cross-sectional inertia for the sleeve, and L may be a length of the rod.

In another advantageous embodiment, a method may be present for performing an operation on a workpiece. A tool holder with a sleeve and the workpiece may be positioned relative to each other. The tool holder may be attached to a machine and may have a first stiffness. The sleeve may have a channel and a second stiffness. The channel may be configured to receive at least a portion of a rod. The operation may be performed using the rod with a tool on the workpiece.

In yet another advantageous embodiment, a method may be present for performing an operation on a workpiece. A rod with a sleeve and a workpiece may be positioned relative to each other. The rod may have a first end, a second end, and a first stiffness. A first interface at the first end of the rod may be attached to a machine. A second interface at the second end of the rod may hold a tool. The sleeve may have a channel and a second stiffness. The channel may be configured to receive at least a portion of the rod. The operation may be performed using the rod with the tool on the workpiece by rotating at least one of the rod with the tool and the workpiece and establishing contact between the tool and the workpiece while rotating at least one of the rod with the tool and the workpiece. The operation may be selected from one of a milling operation and a boring operation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
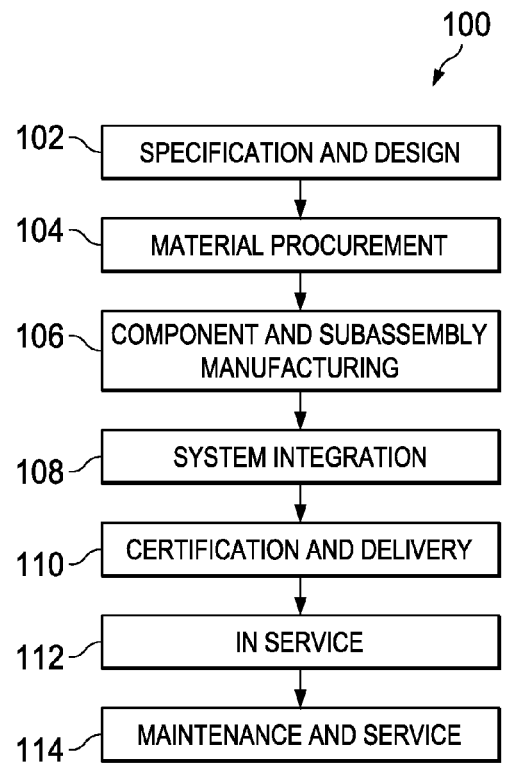
FIG. 1 is an illustration of an aircraft manufacturing and service method in accordance with an advantageous embodiment.
Figure 2:
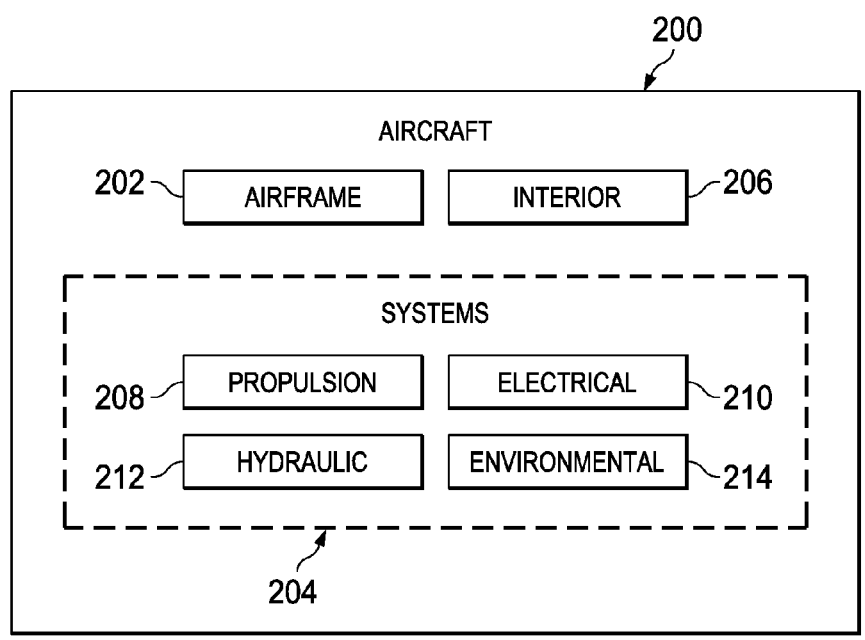
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments are one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that tool holders may be made of steel. Steel may be selected as the material because of the cost and strength of this type of material. However, with the use of steel, as the length of the tool holder increases, increased flexing of the tool holder may result in increased deflection of the tool during different operations.

The different advantageous embodiments recognize and take into account that one solution may involve using a carbide tool holder. A carbide tool holder may be comprised of a carbide in which one component may be carbon and a second component may be a less electronegative element. These materials may include, for example, without limitation, titanium carbide, tungsten carbide, and/or other suitable materials. Carbide may be about three to five times stiffer than steel of the same dimensions for a tool holder. As a result, tool holders having a longer length may be used while avoiding undesired finishes or other effects on the workpiece.

Carbides, however, may cost more than tool holders made from steel. As a result, the expense for performing operations on workpieces may be increased with the use of carbide tool holders. In addition, obtaining tools using non-industry standard materials may require longer lead times from tool holder suppliers.

The different advantageous embodiments also recognize and take into account that another solution may involve using tool holders with a larger diameter when the length of the tool holders increases. The increased diameter may decrease the flexing of the tool holder when the length of the tool holder is increased. This solution may be used instead of employing a higher-cost material. However, in some cases, the size of the cutter that may be desired for use in performing the operations may have a smaller diameter than the tool holder with the larger diameter.

The different advantageous embodiments recognize and take into account that yet another solution may involve removing materials from a workpiece using the tool holder at a slower rate. This slower rate may be achieved by, for example, without limitation, a decrease in rotational speed, a decrease in feed rates, or a decrease in the depth of cuts made by the tool. The slower rate may reduce and/or prevent undesirable chatter. This solution, however, may increase the time needed to manufacture parts and structures for platforms, such as aircraft.

Thus, the different advantageous embodiments provide a method and apparatus for a tool holder. In one advantageous embodiment, an apparatus may comprise a tool holder and a sleeve. The tool holder may comprise a rod, a first interface, and a second interface. The rod may have a first end and a second end in which the rod may have a first stiffness. A first interface may be located at the first end, and a second interface may be located at the second end. The first interface may be configured for attachment to a machine, and the second interface may be configured to hold a tool.

The sleeve may have a channel, a first opening at a first end of the channel, and a second opening at a second end of the channel. The sleeve may have a second stiffness in which the channel is configured to receive at least a portion of a rod through the first opening and the second opening.

Figure 3:
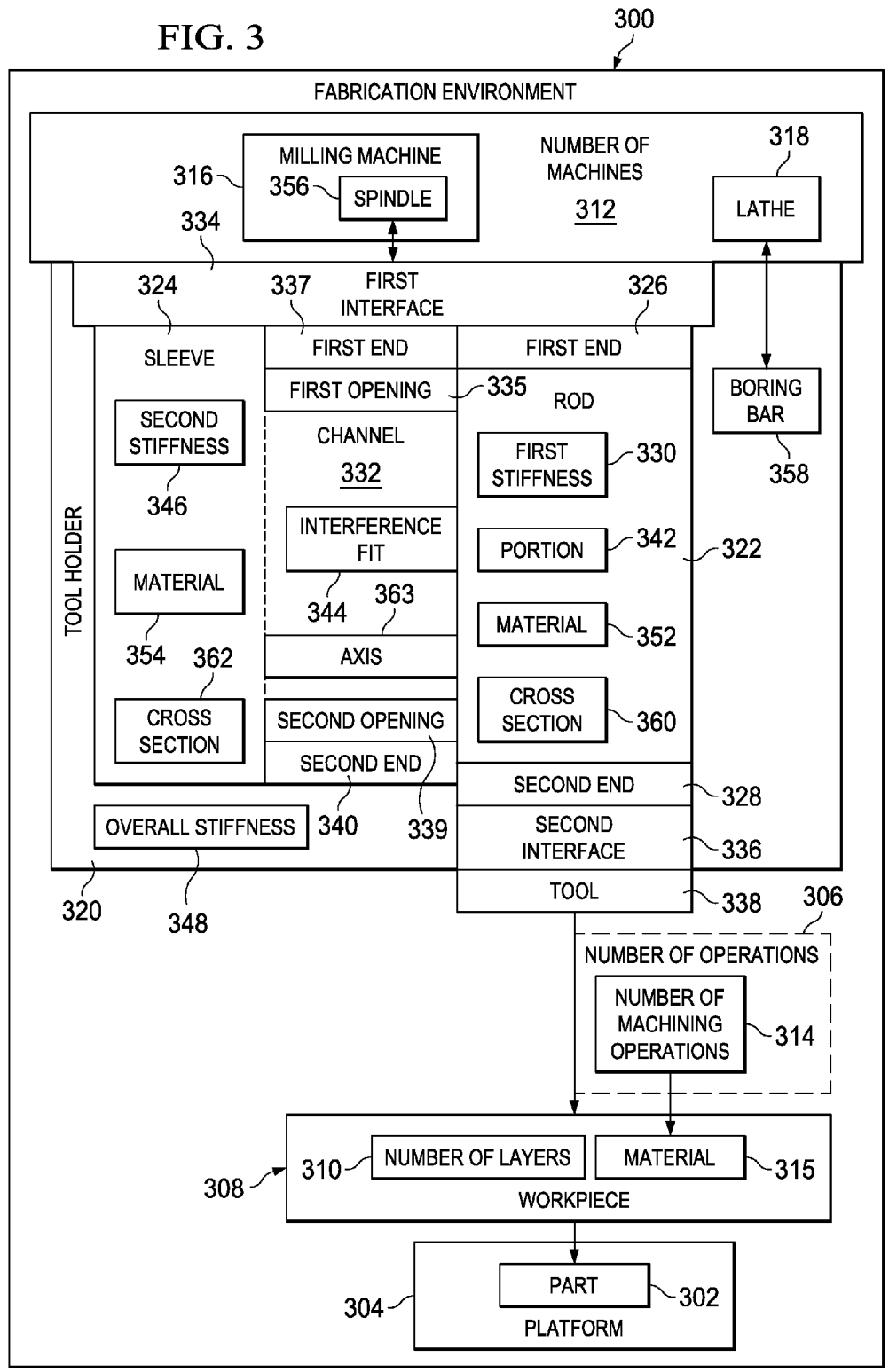
FIG. 3 is an illustration of a fabrication environment in accordance with an advantageous embodiment.

With reference now to FIG. 3, an illustration of a fabrication environment is depicted in accordance with an advantageous embodiment. Fabrication environment 300 is an example of an environment that may be used to manufacture part 302 for platform 304.

In these illustrative examples, platform 304 may be aircraft 200 in FIG. 2. Part 302 may be, for example, without limitation, a rib, a spar, a wing, a vertical stabilizer, a horizontal stabilizer, a support structure, a skin panel, a bracket, or some other suitable type of part. In these illustrative examples, part 302 may be fabricated by performing number of operations 306 on workpiece 308. Workpiece 308 may be comprised of number of layers 310. Number of layers 310 may be, for example, without limitation, metal, steel, titanium, aluminum, a composite material, air, copper, plastic, or some other suitable type of material. In these illustrative examples, number of operations 306 may be performed using number of machines 312.

In this illustrative example, number of machines 312 may be used to perform number of machining operations 314 within number of operations 306. Number of machining operations 314 may include operations that may remove material 315 from workpiece 308.

In these illustrative examples, number of machines 312 may include, for example, without limitation, milling machine 316, lathe 318, and/or any other suitable type of machine.

Tool holder 320 may be used in number of machines 312. Tool holder 320 may comprise rod 322. Sleeve 324 may be used with tool holder 320. Rod 322 may have first stiffness 330 in these illustrative examples. Rod 322 also may have first end 326 and second end 328. First interface 334 may be located at first end 326, while second interface 336 may be located at second end 328. First interface 334 may be configured for attachment to number of machines 312. Second interface 336 may be configured for holding tool 338. Tool 338 may be, for example, without limitation, a cutter, a blade, a drill bit, or some other suitable type of tool.

In these illustrative examples, sleeve 324 may have channel 332. First opening 335 may be located at first end 337 of channel 332, and second opening 339 may be located at second end 340 of channel 332.

Sleeve 324 may be configured to receive at least portion 342 of rod 322 through first opening 335 and second opening 339 in these illustrative examples. Sleeve 324 and rod 322 may be secured to each other through interference fit 344. In this illustrative example, sleeve 324 may have second stiffness 346. Second stiffness 346 may be greater than first stiffness 330 in these illustrative examples.

The combination of rod 322 with sleeve 324 may result in tool holder 320 having overall stiffness 348. Overall stiffness 348 may be greater than first stiffness 330, but may be less than second stiffness 346.

In these illustrative examples, rod 322 may be comprised of material 352. Sleeve 324 may be comprised of material 354. The selection of material 352 and material 354 may be such to obtain first stiffness 330 and second stiffness 346, respectively.

In these illustrative examples, material 352 may be, for example, without limitation, steel. Material 354 may be, for example, without limitation, a carbide, such as a carbide metal. The carbide metal may be, for example, a combination of carbon and a metal that is less electronegative than carbon. In these illustrative examples, a carbide may be, for example, without limitation, tungsten carbide, titanium carbide, or any other suitable type of carbide metal. Of course, material 352 and material 354 may be selected from other types of materials. For example, without limitation, material 352 for rod 322 may be, a material selected from aluminum, iron, titanium, or other suitable materials. Material 354 for sleeve 324 also may include, for example, without limitation, a ceramic material, calcium carbide, silicon carbide, a tungsten alloy, osmium, diamond, a rhenium alloy, molybdenum, composite materials, and/or other suitable materials.

In the illustrative examples, when tool holder 320 is configured for use with milling machine 316, first interface 334 may be configured for connection to spindle 356 in milling machine 316. In this manner, tool holder 320 with tool 338 may be rotated by spindle 356.

In yet other advantageous embodiments, when tool holder 320 is configured for use with lathe 318, tool holder 320 may be referred to as boring bar 358. In this type of embodiment, boring bar 358 may be secured to lathe 318 such that boring bar 358 may not rotate while workpiece 308 rotates.

Additionally, rod 322 may have cross section 360, and sleeve 324 may have cross section 362. Cross section 360 and cross section 362 may have a number of different shapes, depending on the particular implementation. Cross section 360 and cross section 362 may be, for example, without limitation, circles, hexagons, octagons, ellipses, and/or some other suitable shapes. Additionally, cross section 362 may taper along axis 363 for rod 322 and sleeve 324.

The illustration of fabrication environment 300 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, fabrication environment 300 may include other types of machines in addition to or in place of milling machine 316 and lathe 318. For example, number of machines 312 may include a sanding machine, a painting machine, a fastener system, or some other suitable type of machine. Further, although sleeve 324 is described as a single piece sleeve, sleeve 324 may have multiple pieces that may be placed adjacent to each other to form channel 332. In some advantageous embodiments, sleeve 324 may be considered part of tool holder 320.

Figure 4:
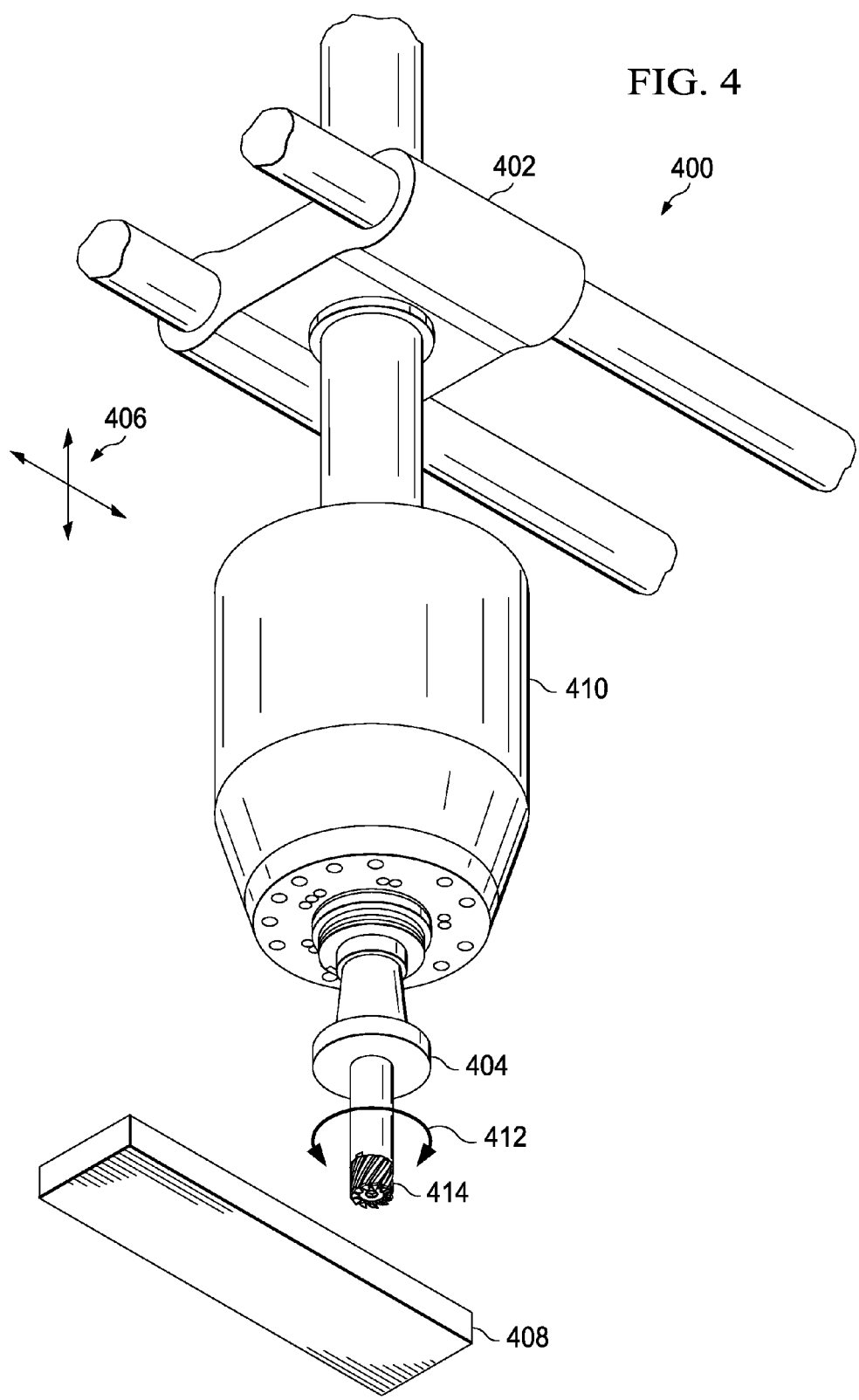
FIG. 4 is an illustration of a fabrication environment in accordance with an advantageous embodiment.

With reference next to FIG. 4, an illustration of a fabrication environment is depicted in accordance with an advantageous embodiment. In this illustrative example, fabrication environment 400 may be an example of one implementation of fabrication environment 300 in FIG. 3. In this illustrative example, only a portion of milling machine 402 is depicted.

In this illustrative example, fabrication environment 400 may comprise milling machine 402 and tool holder 404. In this example, milling machine 402 may be an example of one implementation of milling machine 316 in number of machines 312 in FIG. 3. As depicted, milling machine 402 may be moved about axes 406. Milling machine 402 may perform operations on workpiece 408.

Tool holder 404 may hold tool 414 in this illustrative example. As depicted, tool holder 404 may be connected to spindle 410 of milling machine 402. Spindle 410 may rotate tool holder 404 in the direction of arrow 412. In this illustrative example, tool 414 may be moved relative to workpiece 408. Workpiece 408 may remain stationary in these illustrative examples.

The illustration of fabrication environment 400 is only an example of one manner in which fabrication environment 400 may be implemented. This illustration is not meant to imply physical or architectural limitations to the manner in which other advantageous embodiments may be implemented. For example, in other advantageous embodiments, tool holder 404 may be stationary, while workpiece 408 is moved by lathe 318 in FIG. 3.

Figures 5, 6:
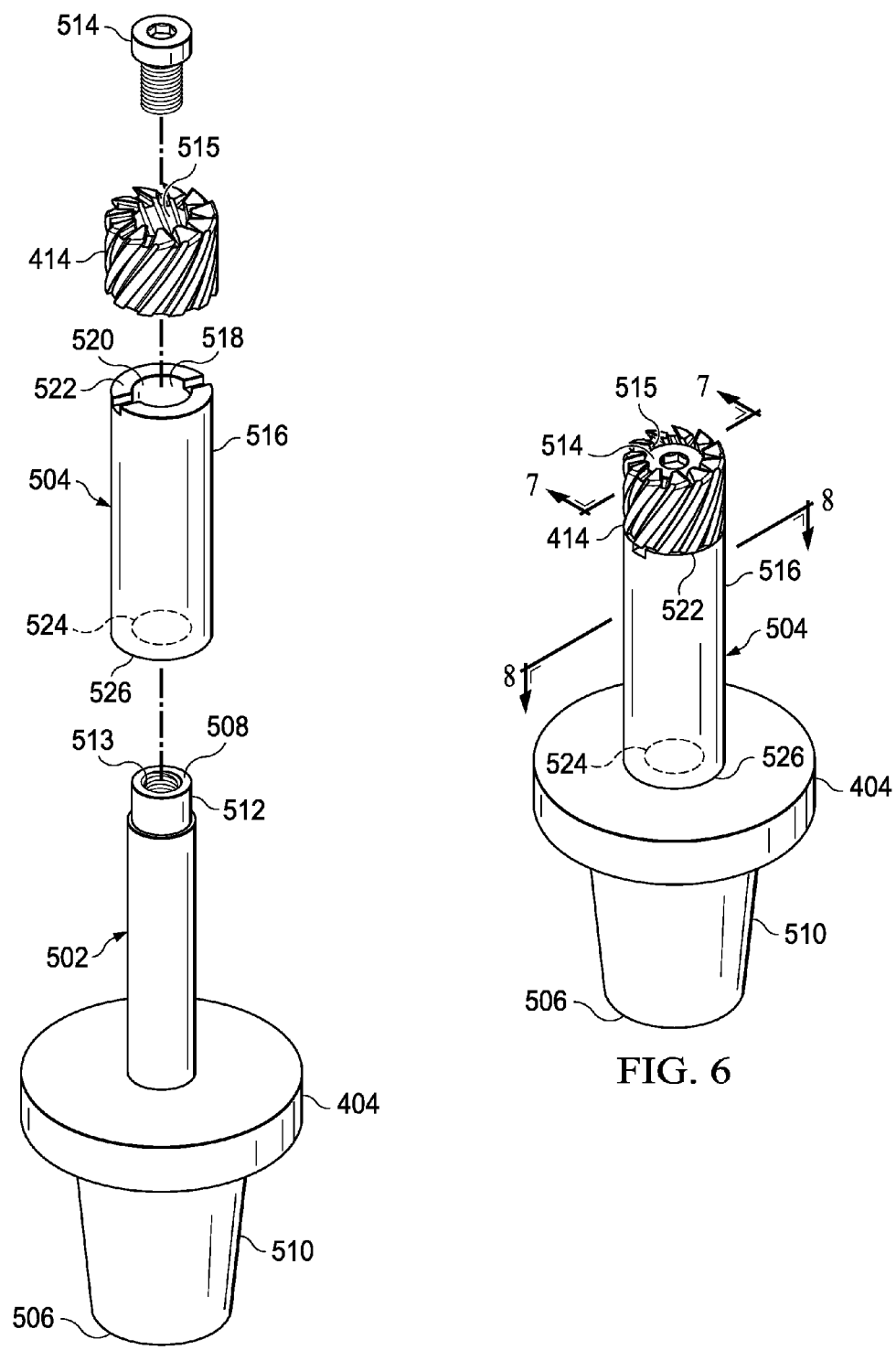
FIG. 5 is an illustration of an exploded perspective view of a tool holder and a sleeve in accordance with an advantageous embodiment.
FIG. 6 is an illustration of a perspective view of a tool holder with a sleeve in accordance with an advantageous embodiment.

With reference now to FIG. 5, an illustration of an exploded perspective view of a tool holder with a sleeve is depicted in accordance with an advantageous embodiment. Tool holder 404 from FIG. 4 is shown in a more detailed view. In this illustrative example, tool holder 404 may be an example of one implementation for tool holder 320 in FIG. 3.

As depicted, tool holder 404 may comprise rod 502. Sleeve 504 may be used with tool holder 404. Sleeve 504 may be an example of an implementation of sleeve 324 in FIG. 3. Additionally, rod 502 may have first end 506 and second end 508. Tool holder 404 also may have first interface 510 and second interface 512.

First interface 510 at first end 506 may be configured to be attached to spindle 410 of milling machine 402 in FIG. 4. Second interface 512 at second end 508 may be configured to hold tool 414.

In this illustrative example, second interface 512 may comprise threaded channel 513. Screw 514 may be placed through channel 515 in tool 414 and engage threaded channel 513 to secure tool 414 to second interface 512.

As depicted, sleeve 504 may have cylindrical shape 516. Sleeve 504 may have channel 518 with first opening 520 at first end 522 and second opening 524 at second end 526. Sleeve 504 may be configured to receive at least a portion of rod 502 through first opening 520 and second opening 524. Sleeve 504 may be attached to rod 502 through an interference fit in this illustrative example. In other advantageous embodiments, sleeve 504 may be removable from rod 502.

With reference now to FIG. 6, an illustration of a perspective view of tool holder 404 and sleeve 504 are depicted in accordance with an advantageous embodiment. In this illustration, tool holder 404 and sleeve 504 are shown in an assembled view with tool 414 secured to second interface 512, which is hidden in this view.

Figure 7:
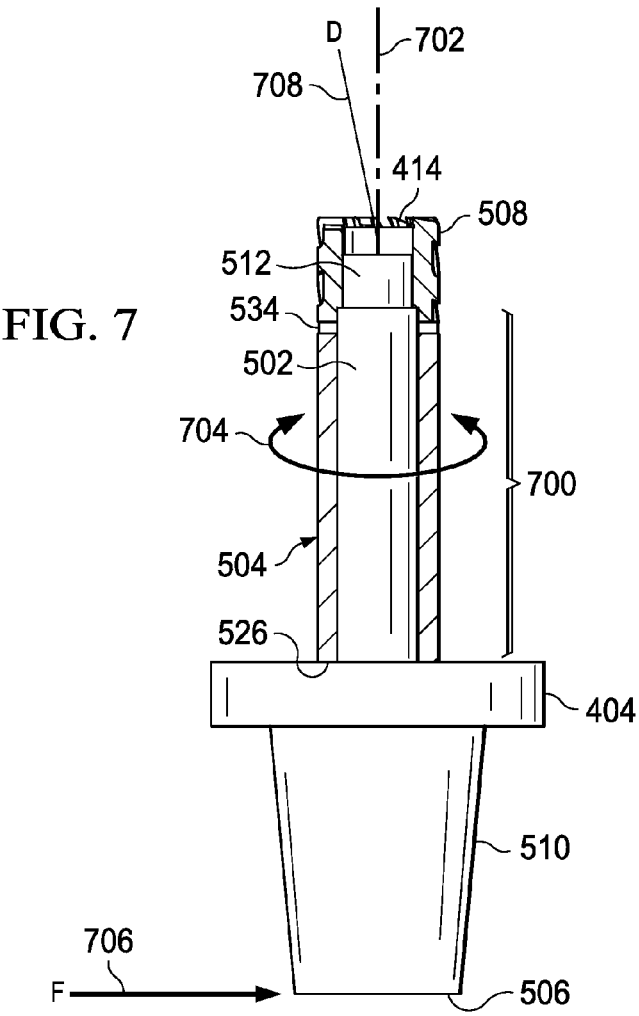
FIG. 7 is an illustration of a cross-sectional side view of a tool holder with a sleeve in accordance with an advantageous embodiment.

With reference now to FIG. 7, an illustration of a cross-sectional side view of a tool holder with a sleeve is depicted in accordance with an advantageous embodiment. In this illustrative example, tool holder 404 and sleeve 504 is shown in a cross-sectional side view taken along lines 7-7 in FIG. 6.

As illustrated, rod 502 may have length L 700. In this illustrative example, length L 700 may be the length of rod 502. Length L 700 may not include first interface 510 and second interface 512.

In this illustrative example, tool holder 404 may have center line 702. Rod 502 for tool holder 404 may rotate about center line 702 in the direction of arrow 704 in these illustrative examples.

In these illustrative examples, during rotation of tool holder 404, force F 706 may be applied to first end 506 of tool holder 404 when tool holder 404 and sleeve 504 with tool 414 is used to perform operations. During rotation of rod 502, rod 502 may be deflected or bent away from center line 702 by application of force F 706. This deflection of rod 502 may be deflection D 708.

Figure 8:
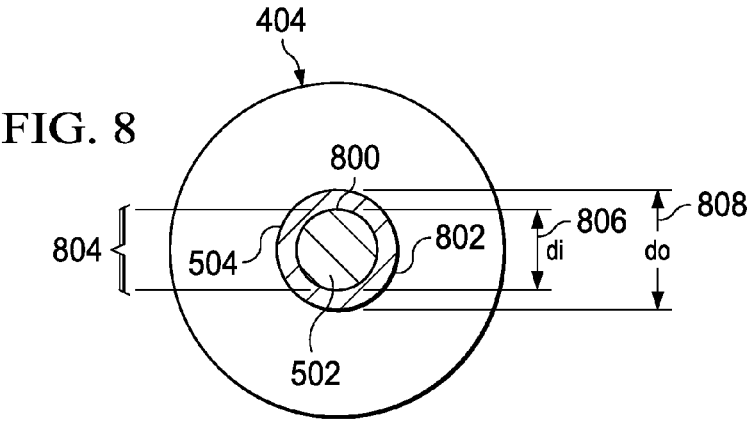
FIG. 8 is an illustration of a cross-sectional view of a tool holder with a sleeve in accordance with an advantageous embodiment.

With reference now to FIG. 8, an illustration of a cross-sectional view of a tool holder with a sleeve is depicted in accordance with an advantageous embodiment. In this illustrative example, a cross-sectional view of tool holder 404 and sleeve 504 from first end 506 is illustrated. This view is taken along lines 8-8 in FIG. 6.

In this illustration, rod 502 may have cross section 800, and sleeve 504 may have cross section 802. In this illustrative example, cross section 800 and cross section 802 may have the shape of a circle.

Cross section 800 for rod 502 may have diameter 804. Cross section 802 for sleeve 504 may have inner diameter 806 and outer diameter 808.

Figures 9, 10:
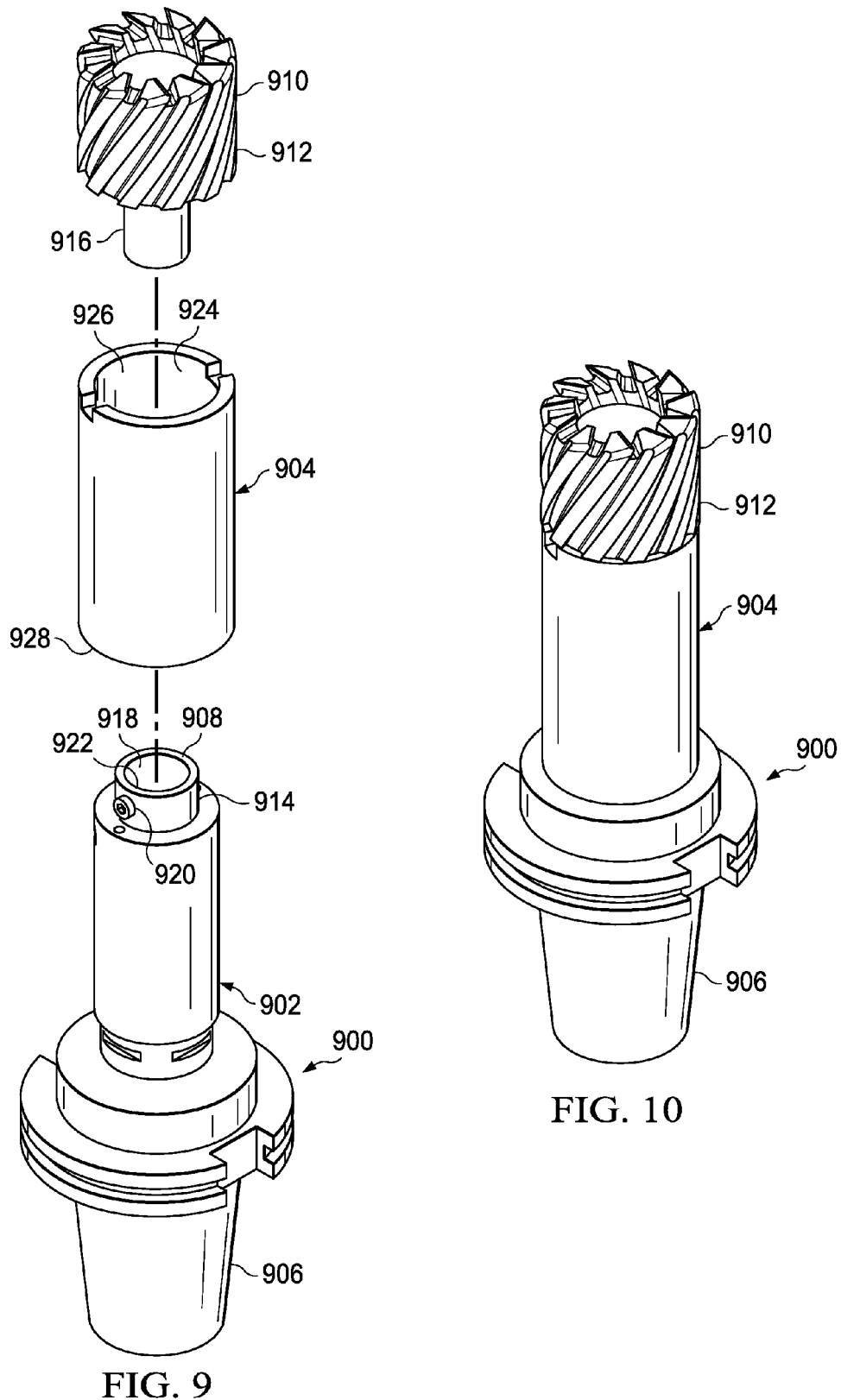
FIG. 9 is an illustration of a perspective view of a tool holder with a sleeve in accordance with an advantageous embodiment.
FIG. 10 is an illustration of a perspective view of a tool holder with a sleeve in accordance with an advantageous embodiment.

With reference now to FIG. 9, an illustration of a perspective view of a tool holder with a sleeve is depicted in accordance with an advantageous embodiment. In this illustrative example, tool holder 900 is an illustrative example of another implementation for tool holder 320 in FIG. 3.

As depicted, tool holder 900 may include rod 902. Sleeve 904 may be used with rod 902. Sleeve 902 may be an example of an implementation of sleeve 324 in FIG. 3. As illustrated, rod 902 may have first interface 906 and second interface 908.

First interface 906 may be configured for attachment to a machine, such as milling machine 402 in FIG. 4 or milling machine 316 in FIG. 3. Second interface 908 may be configured to receive tool 910. In this example, tool 910 may take the form of cutter 912. Second interface 908 may take the form of hydraulic holder 914. When member 916 of tool 910 is placed into channel 918 of hydraulic holder 914, screw 920 in hydraulic holder 914 may be turned to cause pressure to be exerted by walls 922 of channel 918 of hydraulic holder 914 on member 916 of cutter 912.

Sleeve 904 may have channel 924. Sleeve 904 may have first opening 926 and second opening 928 for channel 924. Channel 924 may be configured to receive rod 902 in first opening 926 and/or second opening 928 in these illustrative examples.

With reference now to FIG. 10, an illustration of a perspective view of a tool holder with a sleeve is depicted in accordance with an advantageous embodiment. In this illustrative example, tool holder 900 is shown in a perspective view in an assembled state.

Figure 11:
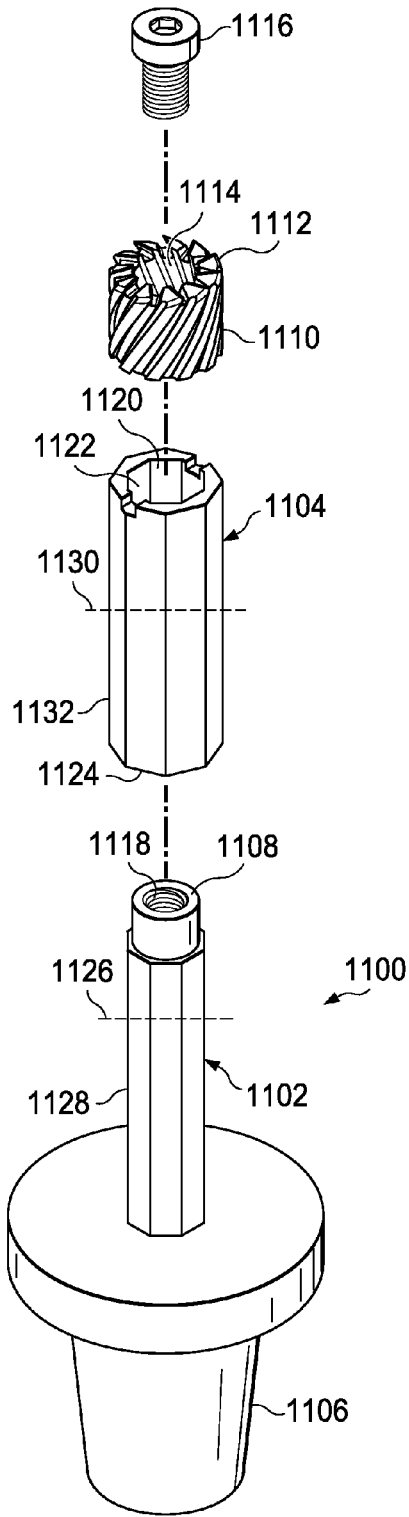
FIG. 11 is an illustration of a perspective view of a tool holder with a sleeve in accordance with an advantageous embodiment.

Turning now to FIG. 11, an illustration of a perspective view of a tool holder with a sleeve is depicted in accordance with an advantageous embodiment. In this illustrative example, tool holder 1100 may be an example of an implementation for tool holder 320 in FIG. 3. In this illustrative example, tool holder 1100 may be used in milling machine 316 in FIG. 3 or milling machine 402 in FIG. 4.

As illustrated, tool holder 1100 may comprise rod 1102. Sleeve 1104 may be used with told holder 1100. Sleeve 1104 may be an example of an implementation of sleeve 324 in FIG. 3. Rod 1102 may have first interface 1106 and second interface 1108.

First interface 1106 may be configured to be secured to a machine, such as milling machine 316 in FIG. 3 or milling machine 402 in FIG. 4. Second interface 1108 may be configured to receive tool 1110. In these examples, tool 1110 may be cutter 1112. Cutter 1112 may have channel 1114, which may receive second interface 1108. Screw 1116 may be placed through channel 1114 and into threaded channel 1118 in second interface 1108.

In this illustrative example, sleeve 1104 may have channel 1120 with first opening 1122 and second opening 1124. Rod 1102 may be received through second opening 1124 into channel 1120 and through first opening 1122 in these illustrative examples.

In this example, rod 1102 may have cross section 1126 in the shape of octagon 1128. In a similar fashion, channel 1120 also may have cross section 1130 in the shape of octagon 1132.

Figure 12:
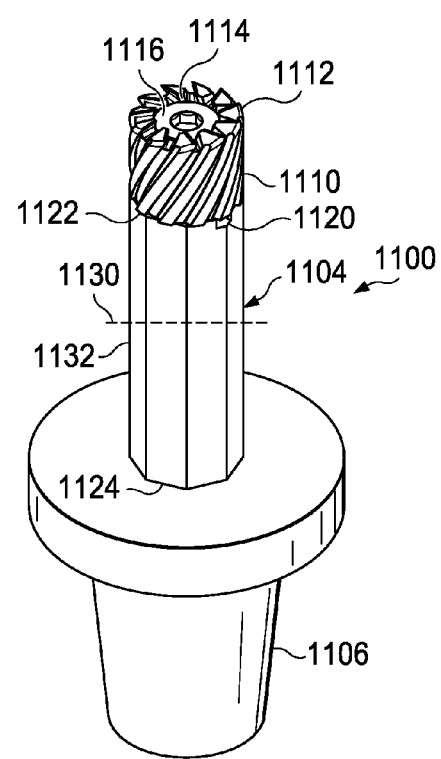
FIG. 12 is an illustration of a perspective view of a tool holder with a sleeve in accordance with an advantageous embodiment.

With reference now to FIG. 12, an illustration of a perspective view of a tool holder with a sleeve is depicted in accordance with an advantageous embodiment. In this example, tool holder 1100 is shown in an assembled view.

Figure 13:
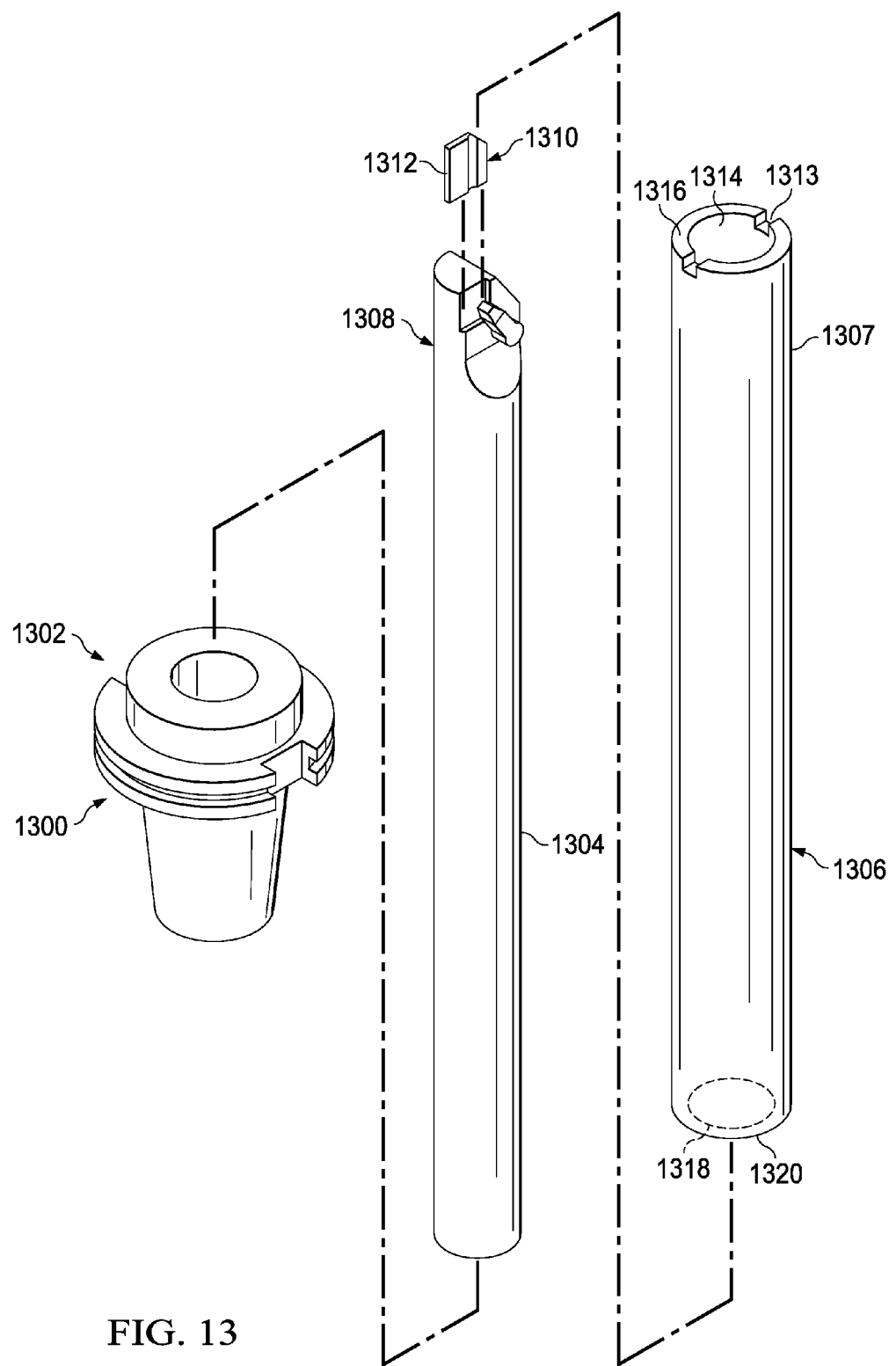
FIG. 13 is an illustration of a tool holder in the form of a boring bar with a sleeve in accordance with an advantageous embodiment.

With reference now to FIG. 13, an illustration of a tool holder in the form of a boring bar with a sleeve is depicted in accordance with an advantageous embodiment. In this illustrative example, an exploded perspective view of tool holder 1300 is illustrated. In this illustrative example, tool holder 1300 may be boring bar 1302. Boring bar 1302 is an example of another implementation for tool holder 320 in FIG. 3.

Boring bar 1302 may comprise rod 1304. Sleeve 1306 may be used with boring bar 1302. Sleeve 1306 may be an example of an implementation of sleeve 324 in FIG. 3. Rod 1304 may have interface 1307 and interface 1308.

Interface 1308 may be configured for attachment to a machine, such as lathe 318 in FIG. 3. Interface 1308 may receive cutter 1310. In this example, cutter 1310 may take the form of blade 1312.

Sleeve 1306 may have channel 1313 with opening 1314 at end 1316 and opening 1318 at end 1320. Sleeve 1306 may receive rod 1304. Sleeve 1306 may be attached or removably placed over rod 1304 in these illustrative examples.

Figure 14:
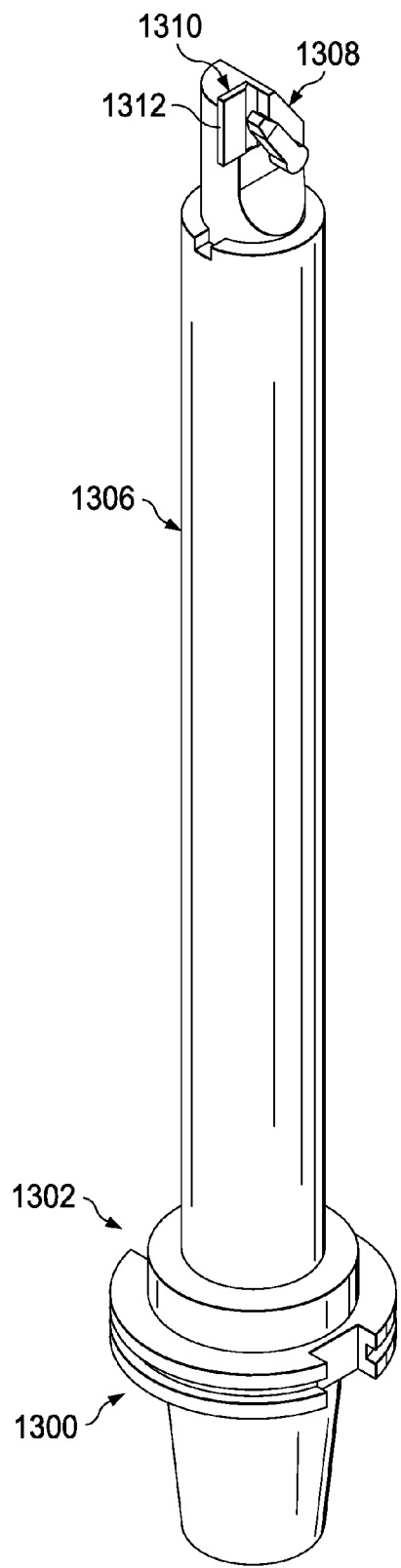
FIG. 14 is an illustration of a perspective view of a tool holder with a sleeve in accordance with an advantageous embodiment.

In FIG. 14, an illustration of a perspective view of a tool holder with a sleeve is depicted in accordance with an advantageous embodiment. Tool holder 1300 is illustrated in an assembled form in this figure.

The illustrations of tool holders 404 in FIGS. 4-8, tool holder 900 in FIGS. 9-10, tool holder 1100 in FIGS. 11-12, and tool holder 1300 in FIGS. 13-14 are presented only as examples of some implementations for tool holder 320 in FIG. 3. Sleeve 504 in FIGS. 4-8, sleeve 904 in FIGS. 9-10, sleeve 1104 in FIG. 11-12, and sleeve 1324 in FIGS. 13-14 are present only as examples of some implementations for sleeve 324 in FIG. 3. These illustrative examples are not meant to imply physical or architectural limitations to the manner in which tool holder 320 may be implemented in other advantageous embodiments.

For example, in other advantageous embodiments, a tool holder may have a different cross-sectional shape in place of a circle or octagon as shown for tool holder 404 and tool holder 1100, respectively. As another example, a tool holder may be configured for use with other machines, other than a milling machine or lathe. These machines may be, for example, without limitation, routers, gear hobbing machines, shapers, and/or other suitable machines.

Figure 15:
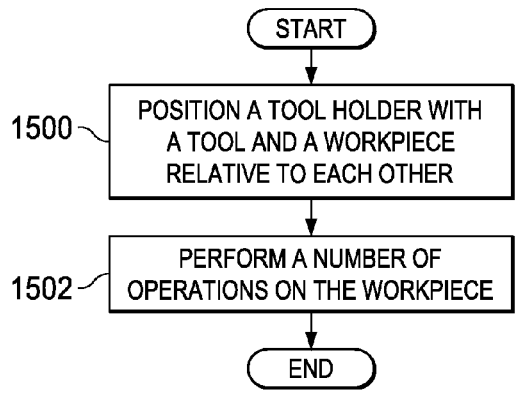
FIG. 15 is an illustration of a flowchart of a process for performing an operation on a workpiece in accordance with an advantageous embodiment.

With reference now to FIG. 15, an illustration of a flowchart of a process for performing an operation on a workpiece is depicted in accordance with an advantageous embodiment. The process illustrated in FIG. 15 may be implemented in fabrication environment 300 in FIG. 3. In this illustrative example, number of operations 306 may be performed on workpiece 308 using number of machines 312.

The process may begin by positioning tool holder 320 with tool 338 and workpiece 308 relative to each other (operation 1500). The positioning of tool holder 320 with tool 338 relative to workpiece 308 may be performed in a number of different ways, depending on the particular machine in number of machines 312. For example, if milling machine 316 is used, workpiece 308 may be stationary. If lathe 318 is used, tool holder 320 may be stationary while workpiece 308 moves.

Thereafter, number of operations 306 are performed on workpiece 308 (operation 1502), with the process terminating thereafter.

Figure 16:
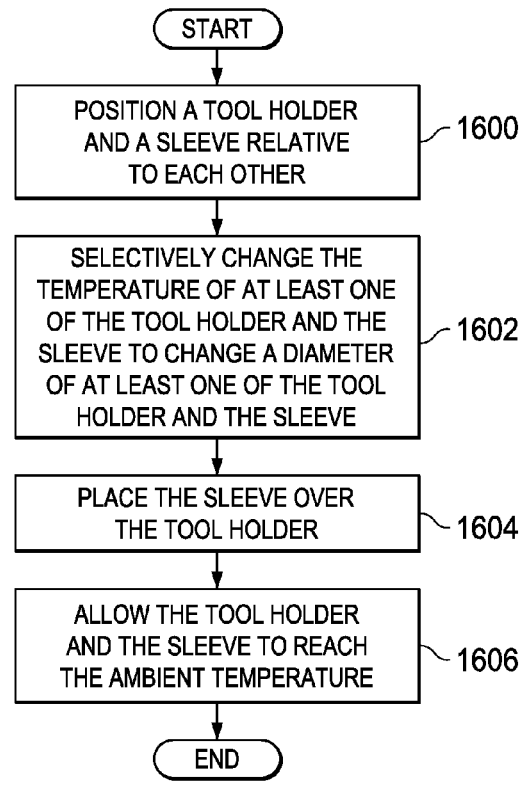
FIG. 16 is an illustration of a flowchart of a process for forming an interference fit between a tool holder and a sleeve in accordance with an advantageous embodiment.

With reference now to FIG. 16, an illustration of a flowchart of a process for forming an interference fit between a tool holder and a sleeve is depicted in accordance with an advantageous embodiment. The process illustrated in FIG. 16 may be implemented using tool holder 320 and sleeve 324 in FIG. 3.

The process may begin by positioning tool holder 320 and sleeve 324 relative to each other (operation 1600). In particular, in operation 1600, sleeve 324 and rod 322 of tool holder 320 may be positioned relative to each other. The process may then selectively change the temperature of at least one of tool holder 320 and sleeve 324 to change a diameter of at least one of tool holder 320 and sleeve 324 (operation 1602). The diameters of tool holder 320 and/or sleeve 324 may be changed such that sleeve 324 is capable of fitting over tool holder 320. As one example, without limitation, tool holder 320 may be cooled to reduce the diameter of tool holder 320. In another example, sleeve 324 may be heated to increase the diameter of sleeve 324. In yet another example, tool holder 320 may be cooled and sleeve 324 may be heated.

Thereafter, sleeve 324 may be placed over tool holder 320 (operation 1604). For example, a selected amount of force may be used to place and/or slide sleeve 324 over tool holder 320 such that sleeve 324 covers at least a portion of tool holder 320. In this illustrative example, sleeve 324 may be placed over rod 322 of tool holder 320 such that sleeve 324 receives rod 322 in channel 332.

The process may then allow tool holder 320 and sleeve 324 to reach an ambient temperature (operation 1606), with the process terminating thereafter. In this manner, interference fit 344 may be formed between sleeve 324 and tool holder 320. In other words, sleeve 324 may fit over tool holder 320 with a tightness such that sleeve 324 is fastened to tool holder 320.

Figure 17:
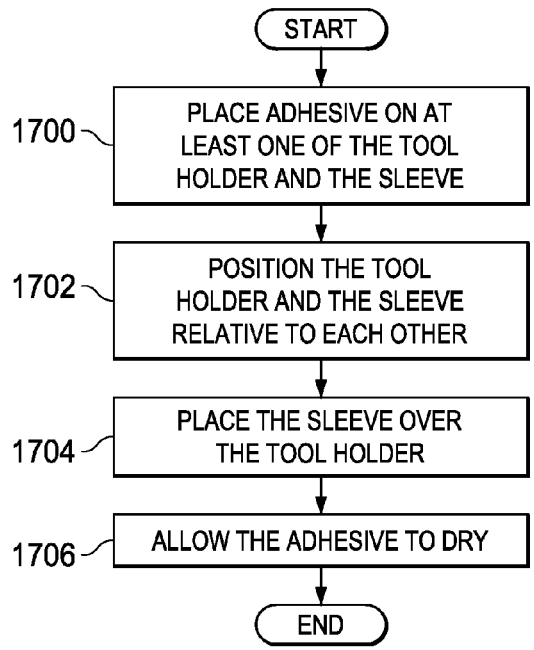
FIG. 17 is an illustration of a flowchart of a process for fastening a sleeve to a tool holder in accordance with an advantageous embodiment.

With reference now to FIG. 17, an illustration of a flowchart of a process for fastening a sleeve to a tool holder is depicted in accordance with an advantageous embodiment. The process illustrated in FIG. 17 may be implemented using tool holder 320 and sleeve 324 in FIG. 3.

The process may begin by placing an adhesive on at least one of tool holder 320 and sleeve 324 (operation 1700). In this illustrative example, adhesive may be placed on the outside of rod 322 of tool holder 320 and/or on the inside of channel 332 of sleeve 324. In other examples, adhesive may be placed on one of rod 322 and sleeve 324. In yet other examples, adhesive may be placed on a portion of tool holder 320 and/or sleeve 324.

Thereafter, the process may position tool holder 320 and sleeve 324 relative to each other (operation 1702). The process may then place sleeve 324 over tool holder 320 (operation 1704). In this illustrative example, sleeve 324 may be placed over and/or slide over rod 322 of tool holder 320 such that sleeve 324 covers at least a portion of tool holder 320. The process may then allow the adhesive to dry (operation 1704), with the process terminating thereafter. In this manner, sleeve 324 may be fastened to tool holder 320.

Figure 18:
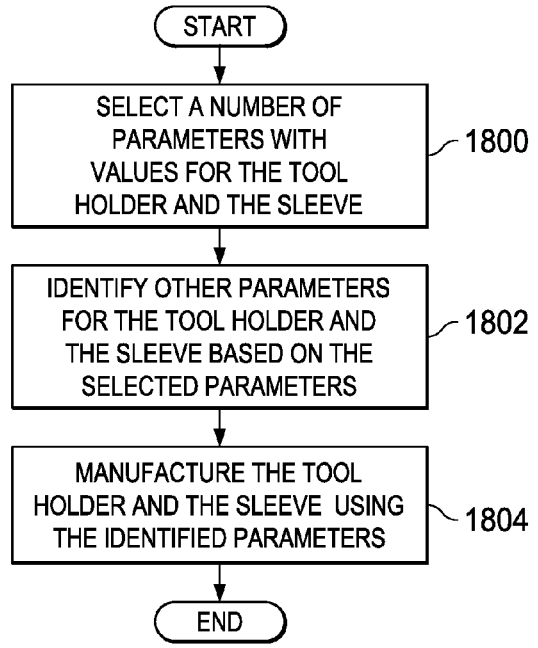
FIG. 18 is an illustration of a flowchart of a process for fabricating a tool holder in accordance with an advantageous embodiment.

With reference now to FIG. 18, an illustration of a flowchart of a process for fabricating a tool holder is depicted in accordance with an advantageous embodiment. The process illustrated in FIG. 18 may be used to design and/or manufacture tool holder 320 and sleeve 324 in FIG. 3.

The process may begin by selecting a number of parameters with values for tool holder 320 and sleeve 324 (operation 1800). For example, without limitation, the number of parameters may include at least one of a length for rod 322, a diameter for rod 322, a diameter for sleeve 324, first stiffness 330, second stiffness 346, overall stiffness 348, elasticity for rod 322, elasticity for sleeve 324, and/or other suitable parameters.

Thereafter, the process may identify other parameters for tool holder 320 and sleeve 324 based on the selected parameters (operation 1802). In this illustrative example, an equation for deflection may be used to identify various parameters, depending on the selected parameters. Deflection may be calculated as follows:

$$\frac{FL^3}{3EI}$$

wherein F may be force in pounds, L may be length, E may be Young's modulus in pounds per square inch, and I may be cross-sectional inertia. In these examples, Young's modulus may be used to measure elasticity.

When rod 322 and sleeve 324 have different elasticities, deflection may be calculated as follows:

$$D = \frac{FL^3}{3(E_2 I_2 + E_2 I_2)}$$

and the cross-sectional inertia may be calculated as follows:

$$I = \frac{\pi(d_0^4 - d_i^4)}{64}$$

wherein $d_o$ may be an outer diameter and $d_i$ may be an inner diameter. When the cross-sectional inertia is calculated for rod 322, $d_i$ may be zero, because rod 322 may not have an inner diameter.

Thereafter, tool holder 320 and sleeve 324 may be manufactured using the identified parameters (operation 1804), with the process terminating thereafter.

In one illustrative example, tool holder 320 may be selected such that the length of rod 322 has about a six-inch length with about a 1.5 inch diameter. Further, sleeve 324 may be selected to have about a two-inch outer diameter and about a 1.5 inch inner diameter. In this particular example, rod 322 may be made of steel, and sleeve 324 may be made of carbide. The elasticity for steel may be about 29,007,550 pounds per square inch, and the elasticity for carbide may be about 87,022,640 pounds per square inch. With this particular illustrative example, the cross-sectional inertia for rod 322 and sleeve 324 may be as follows:

$$I_1 = \frac{\pi(1.5^4 - 0)}{64}, \text{ and}$$

$$I_2 = \frac{\pi(2^4 - 1.5^4)}{64}.$$

The deflection equation may then be as follows:

$$D = \frac{(325) \cdot 6^3}{3(E_1 \cdot I_1 + E_2 \cdot I_2)} = 0.00039 \text{ ln}$$

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for performing actions on a workpiece. In one advantageous embodiment, an apparatus may comprise a rod and a sleeve. The rod and sleeve may form a tool holder in these illustrative examples. The rod may have a first end and a second end in which the rod may have a first stiffness. A first interface may be located at the first end of the rod in which the first interface may be configured for attachment to a machine. A second interface at the second end of the rod may be configured to hold a tool. The sleeve may have a channel with a first opening at the first end of the channel and a second opening at the second end of the channel. The sleeve may have a second stiffness in which the sleeve may be configured to receive at least a portion of the rod through the first opening and the second opening. The second stiffness may be greater than the first stiffness.

In this manner, tool holders with a desired stiffness may be manufactured or ordered with less cost as compared to tool holders made of a single material. For example, with one or more of the different advantageous embodiments, a need to purchase tool holders made of carbide may be avoided when steel tool holders have insufficient stiffness for operations performed on workpieces. The different advantageous embodiments may allow for the use of longer tool holders with greater stiffness. As a result, high rates of metal removal from workpieces may occur as compared to using tool holders made of steel.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a tool holder configured for use with a machine, the tool holder comprising:
     a rod having a first end, a second end, and a first stiffness, wherein an interface at the second end of the rod is configured to receive a tool, the rod comprising a first cross section with a shape that is one of a hexagon and an octagon; and
     a sleeve having a channel, a first opening at a first end of the channel, a second opening at a second end of the channel, and a second stiffness greater than the first stiffness, the sleeve receiving at least a portion of the rod in the channel, and the sleeve comprising a second cross section that tapers along an axis of the rod and the sleeve, the second cross section having a shape that is one of a hexagon and an octagon.

2. The apparatus of claim 1, wherein an interface at the first end of the rod in which the first interface is configured for attachment to the machine.

3. The apparatus of claim 2, wherein the sleeve is configured to be associated with the rod using an interference fit.

4. The apparatus of claim 1, wherein the machine is selected from one of a milling machine and a lathe.

5. The apparatus of claim 1, wherein the tool holder is a boring bar.

6. The apparatus of claim 1, wherein the tool is a cutter.

7. The apparatus of claim 1,
   wherein an overall stiffness for the rod in the channel of the sleeve is defined by $3(E1I1+E2I2)/L^3$; and
   wherein E1 is Young's modulus for the rod, E2 is Young's modulus for the sleeve, I1 is a cross-sectional inertia for the rod, I2 is a cross-sectional inertia for the sleeve, and L is a length of the rod.

8. The apparatus of claim 1, wherein the rod is comprised of steel and the sleeve is comprised of a carbide having metallic properties.

9. The apparatus of claim 1, wherein the sleeve is comprised of a material selected from the group consisting of a titanium carbide and a tungsten carbide.

10. The apparatus of claim 1, wherein the sleeve is comprised of a material selected from the group consisting of titanium, ziconium, hafnium, rutherfordium, vanadium, niobium, tantalum, dubnium, chromium, molybdenum, tungsten, seaborgium, manganese, technetium, rhenium, bohrium, iron, ruthenium, osmium, hassium, cobalt, and rhodium.

11. The apparatus of claim 1, wherein a diameter of at least one of the sleeve and the rod can be changed by changing the surrounding temperature of at least one of the rod and the sleeve if the sleeve receiving at least a portion of the rod in the channel cannot receive the at least a portion of the rod because a diameter of at least one of the rod and the sleeve is an incorrect size.

12. An apparatus for holding a tool for a milling machine comprising:
   a rod having a first end and a second end, wherein the rod is comprised of steel and has a first stiffness, the rod further comprising a first cross section with a shape that is one of a hexagon and an octagon;
   a first interface at the first end of the rod in which the first interface is configured for attachment to the milling machine;
   a second interface at the second end of the rod in which the second interface is configured to hold the tool; and
   a sleeve comprised of a metal carbide and having a channel and a second stiffness greater than the first stiffness of the rod, the sleeve receiving at least a portion of the rod and retaining the portion of the rod using an interference fit, and the sleeve further comprising a second cross section that tapers along an axis of the rod and the sleeve, the second cross section having a shape that is one of a hexagon and an octagon.

13. An apparatus for holding a cutter for a lathe comprising:
   a rod having a first end and a second end, in which the rod is comprised of steel and has a first stiffness; a first interface at the first end of the rod in which the first interface is configured for attachment to the lathe; a second interface at the second end of the rod is configured to hold the cutter; the rod comprising a first cross section with a shape that is one of a hexagon and an octagon; and a sleeve comprised of a metal carbide and having a channel and a second stiffness greater than the first stiffness of the rod, the sleeve receiving at least a portion of the rod and retaining the portion of the rod using an interference fit, and the sleeve further comprising a second cross section that tapers along an axis of the rod and the sleeve, the second cross section having a shape that is one of a hexagon and an octagon.

14. An apparatus for holding a tool comprising:

a rod having a first end and a second end, wherein the rod is comprised of steel and has a first stiffness, the rod further comprising a first cross section with a shape that is one of a hexagon and an octagon;

a first interface at the first end of the rod in which the first interface is attached to a machine selected from one of a milling machine and a lathe;

a second interface at the second end of the rod holding the tool;

a sleeve having a channel, a first opening at a first end of the channel, a second opening at a second end of the channel, and a second stiffness greater than the first stiffness of the rod; the sleeve receiving at least a portion of the rod such that the rod passes through the first opening and the second opening; the sleeve securing to the rod using an interference fit; the sleeve comprising a material selected from the group consisting of titanium carbide and tungsten carbide; the sleeve comprising a second cross section that tapers along an axis of the rod and the sleeve, the second cross section having a shape that is one of an octagon and a hexagon; and wherein an overall stiffness for the rod in the channel of the sleeve is defined by $3(E1I1+E2I2)/L^3$, wherein E1 is Young's modulus for the rod, E2 is Young's modulus for the sleeve, I1 is a cross-sectional inertia for the rod, I2 is a cross-sectional inertia for the sleeve, and L is a length of the rod.

15. The apparatus of claim 14, wherein a diameter of at least one of the sleeve and the rod can be changed by changing the surrounding temperature of at least one of the rod and the sleeve if the sleeve receiving at least a portion of the rod in the channel cannot receive the at least a portion of the rod because a diameter of at least one of the rod and the sleeve is an incorrect size.

16. A method for performing an operation on a workpiece, the method comprising:

positioning a tool holder relative to the workpiece, the tool holder comprising a rod and a sleeve, the rod having a first end, a second end, and a first stiffness, the rod further comprising a first cross section with a shape that is one of a hexagon and an octagon; a first interface at the first end of the rod attaching to the machine; and a second interface at the second end of the rod holding a tool; the sleeve having a channel and a second stiffness greater than the first stiffness of the rod, wherein the channel receives at least a portion of the rod; and the sleeve further comprising a second cross section that tapers along an axis of the rod and the sleeve, the second cross section having a shape that is one of a hexagon and an octagon; and performing the operation on the workpiece using the rod holding the tool.

17. The method of claim 16, wherein the performing step comprises:

rotating the rod with at least one of the tool and the workpiece; and establishing contact between the tool and the workpiece while rotating the rod with the at least one of the tool and the workpiece.

18. The method of claim 16, wherein the operation is selected from one of a milling operation and a boring operation.

19. The method of claim 16, further comprising selectively changing the temperature of at least one of the rod and the sleeve to change a diameter of at least one of the rod and the sleeve, if the channel receiving the at least a portion of the rod cannot receive the at least a portion of the rod because a diameter of at least one of the rod and the sleeve is an incorrect size.

20. A method for performing an operation on a workpiece, the method comprising:

positioning a rod and the workpiece relative to each other, the rod having a sleeve, a first end, a second end, a first stiffness, and a first cross section with a shape that is one of a hexagon and an octagon; a first interface at the first end of the rod attaching to a machine; a second interface at the second end of the rod holding a tool; the sleeve having a channel and a second stiffness greater than the first stiffness of the rod, the channel receiving at least a portion of the rod; the sleeve further comprising a second cross section that tapers along an axis of the rod and the sleeve, and the second cross section having a shape that is one of a hexagon and an octagon; and performing the operation using the rod with the tool on the workpiece by rotating the rod with at least one of the tool and the workpiece and establishing contact between the tool and the workpiece while rotating the rod with at least one of the tool and the workpiece, wherein the operation is selected from one of a milling operation and a boring operation.

* * * * *